United States Patent
Lo

(10) Patent No.: US 10,289,090 B2
(45) Date of Patent: May 14, 2019

(54) CONTROL DEVICE FOR OBJECTS IN A PHYSICAL SPACE

(71) Applicants: INVENTEC (PUDONG) TECHNOLOGY CORPORATION, Shanghai (CN); INVENTEC CORPORATION, Taipei (TW)

(72) Inventor: Sheng-Hsin Lo, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 155 days.

(21) Appl. No.: 15/455,010

(22) Filed: Mar. 9, 2017

(65) Prior Publication Data

US 2018/0120802 A1     May 3, 2018

(30) Foreign Application Priority Data

Oct. 27, 2016    (CN) .......................... 2016 1 0950480

(51) Int. Cl.
    *G05B 19/042*     (2006.01)
    *G08C 17/00*     (2006.01)

(52) U.S. Cl.
    CPC ......... *G05B 19/0423* (2013.01); *G08C 17/00* (2013.01); *G05B 2219/23051* (2013.01); *G08C 2201/91* (2013.01)

(58) Field of Classification Search
    CPC ................. G05B 19/0423; G05B 2219/23051
    USPC ............................................................ 700/65
    See application file for complete search history.

(56) References Cited

U.S. PATENT DOCUMENTS

| | | | | |
|---|---|---|---|---|
| 6,587,739 B1 * | 7/2003 | Abrams | ................. | G05B 15/02 340/12.32 |
| 2007/0171091 A1 * | 7/2007 | Nisenboim | ............ | G08C 17/00 340/12.24 |
| 2013/0154812 A1 * | 6/2013 | Richardson | ............ | G08C 19/00 340/12.52 |
| 2015/0009022 A1 * | 1/2015 | Cho | ........................ | G08C 17/02 340/12.53 |
| 2015/0301587 A1 * | 10/2015 | Chae | ..................... | G06F 1/3265 713/323 |
| 2017/0205822 A1 * | 7/2017 | Shin | ..................... | G05D 1/0044 |

FOREIGN PATENT DOCUMENTS

KR         20160113440 A    *   9/2016

* cited by examiner

*Primary Examiner* — Robert E Fennema
*Assistant Examiner* — Jigneshkumar C Patel
(74) *Attorney, Agent, or Firm* — Maschoff Brennan

(57) ABSTRACT

A control device is provided. The control device includes a communication module, a processing module, a driving module and a control module. The communication module is configured for receiving a control instruction forwarded from another control device. The control instruction corresponds to a target object of at least one object. The processing module is configured for capturing a target location of the target object. The driving module is configured for driving the control device to move according to the target location. The control module is configured for performing an operation task to the target object according to the control instruction after the control device is moved according to the target location.

4 Claims, 2 Drawing Sheets

CONTROL DEVICE FOR OBJECTS IN A PHYSICAL SPACE

CROSS-REFERENCE TO RELATED APPLICATIONS

This non-provisional application claims priority under 35 U.S.C. § 119(a) on Patent Application No(s) 201610950480.7 filed in China on Oct. 27, 2016, the entire contents of which are hereby incorporated by reference.

TECHNICAL FIELD

The disclosure relates to a control device, more particularly to a control device in a split-type control system.

BACKGROUND

In the present technique of controlling electric devices, it is general to require users to control the electric devices via corresponding controllers. However, the signal coverage of controllers and the signal strength of controllers are limited. Therefore, users have to move to the front of electric devices before controlling the electric devices when locations of the electric devices are far away or other obstacles such as wall or other furniture are placed between users and the electric devices.

Moreover, users have to search for a proper controller when there is a plurality of electric device so that controlling can be achieved. It is not convenient for users.

Furthermore, in the present technique regarding creation of three dimensional images in a particular space, it usually requires to scan a plurality of rooms or corners via labour. However, the scanning process is complicated and some areas may be missed.

SUMMARY

A control device is provided in the present disclosure. The control device includes a communication module, a processing module and a control module. The processing module is coupled to the communication module. The control module is coupled to the processing module. The communication module is configured to receive a control instruction. The instruction corresponds to a target object of at least one object. The processing module is configured to determine whether the target object is within a control range. The control module is configured to perform an operation task to the target object according to the control instruction when the target object is within the control range. Wherein, when the target object is not within the control range, the communication module forwards the control instruction to a counterpart control device.

According to an embodiment of the present disclosure, the processing module further calculates a target location of the target object according to a configuration figure and sends the target location and the control instruction to the counterpart control device.

According to another embodiment of the present disclosure, when the communication module receives an object-added instruction, the processing module updates the configuration figure according to a new location of the object-added instruction.

According to another embodiment of the present disclosure, the at least one object is an electric device, the communication module is further connected to a cloud server for downloading an instruction set of the electric device, and the control module performs the operation task according to the instruction set corresponding to the control instruction.

A control device is provided in the present disclosure. The control device includes a communication module, a processing module, a driving module and a control module. The processing module is coupled to the communication module. The driving module is coupled to the processing module. The control module is coupled to the processing module. The communication is configured to receive a control instruction forwarded from a counterpart control device. The control instruction corresponds to a target object of at least one object. The processing module is configured to capture a target location of the target object. The driving module is configured to drive the control device to move according to the target location. The control module is configured to perform the operation task to the target object according to the control instruction after the control device moves according to the target location.

In one embodiment of the present disclosure, the processing module further calculates the target location of the target object according to a configuration figure.

In another embodiment of the present disclosure, wherein the configuration figure is a three dimensional figure corresponding to a physical space, the processing module further calculates a plurality of searching move path in the physical space according to a recursive algorithm and controls the driving module for moving. A plurality of images is captured by the control module. The processing module recognizes the at least one object from the plurality of images, and the configuration figure is created according to a location corresponding to each image.

In another embodiment of the present disclosure, when the communication module receives an object-added instruction, the processing module controls the driving module for moving in the physical space according to the recursive algorithm to search a new object for updating the configuration figure.

In another embodiment of the present disclosure, the at least one object is an electric device, and the communication module is further connected to a cloud server for downloading an instruction set of the electric device. The control module performs the operation task according to the instruction set corresponding to the control instruction.

In another embodiment of the present disclosure, the operation task includes: capture an image of the target object via the control module, wherein the communication module sends the captured image to the counterpart control device.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
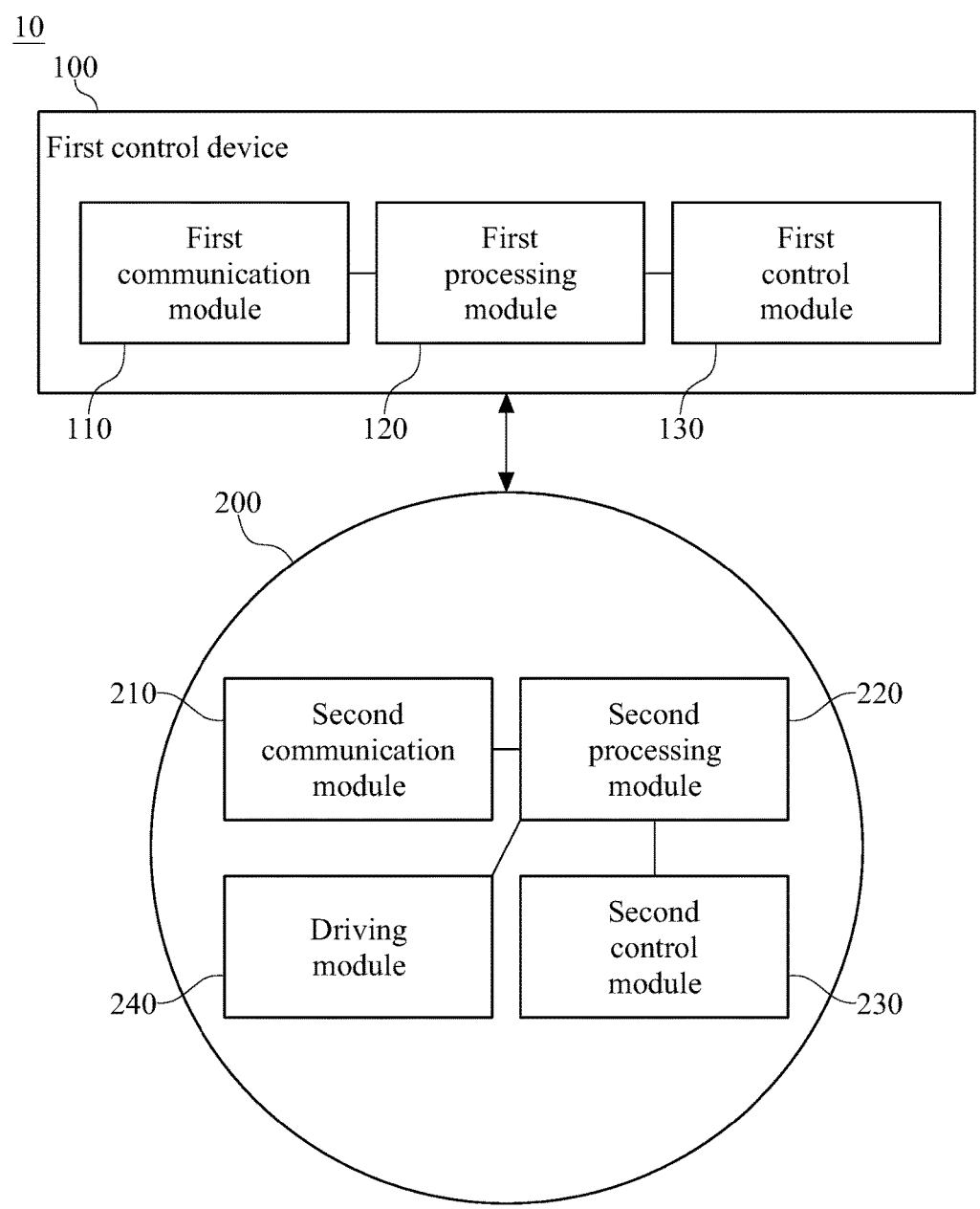
FIG. 1 is a schematic diagram of a split-type control system in one embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram of a split-type control system in one embodiment of the present disclosure. As shown in FIG. 1, split-type control system 10 includes a first control device 100 and a second control device 200. In the embodiment of the present disclosure, the first control device could be a master device. The second control device could be a child device. Generally the first control device is stationary, and the second control device could be moved by a control or moves autonomously. However, in addition to the forms mentioned above, the present disclosure can also include embodiments having other forms, and the present disclosure is not limited to the embodiments above.

Figure 2:
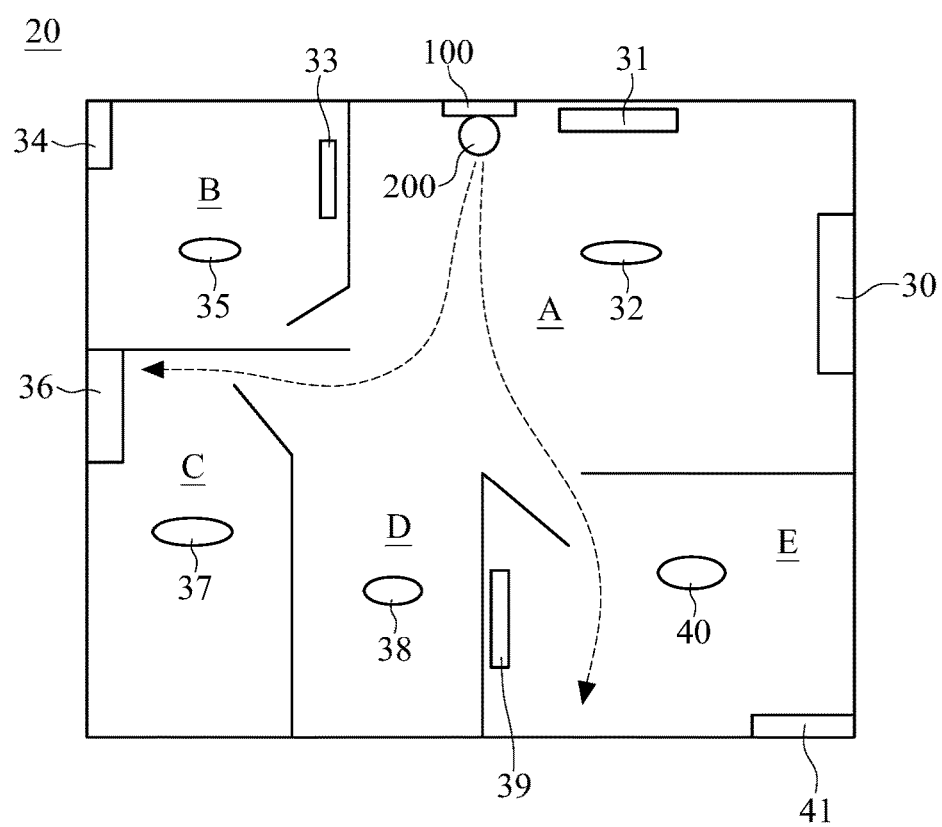
FIG. 2 is a top view diagram of a physical space in one embodiment of the present disclosure.

FIG. 2 is a top view diagram of a physical space in one embodiment of the present disclosure. The first control device 100 and the second control device 200 of the split-type control system 10 could be setup in the physical space 20. The physical space 20 can be divided into several area, such as a living room A, a bedroom B, a kitchen C, a dining room D and a bedroom E.

The first control device 100 includes a first communication module 110, a first processing module 120 and a first control module 130. The first processing module 120 is coupled to the first communication module 110. The first control module 130 is coupled to the first processing module 120. The second control device 200 includes a second communication module 210, a second processing module 220, a second control module 230 and a second driving module 240. The second processing module 220 is coupled to the second communication module 210. The second driving module 240 is coupled to the second processing module 220. The second control module 230 is coupled to the second processing module 220. The first communication module 110, the first processing module 120, the first control module 130, the second communication module 210, the second processing module 220, the second control module 230 and the second driving module 240 could be respectively implemented through microprocessors or chips, or relative function elements, and the present disclosure is not limited to it. The first control device 100 is a counterpart device of the second control device 200. In one example, the first control module 130, the second control module 230, the first processing module 120 and the second processing module 220 could be a central processing unit (CPU) or a micro-controller unit (MCU). The first communication module 110 and the second communication module 210 could be a WIFI module or a bluetooth module.

In general, when a user would like to control an object, the user could send a control instruction to the first control device 100. The control instruction corresponds to a target object of at least one object. For example, the object could be an electric device such as a light, a television, an air conditioner. The object could also be a non-electric device such as a gas stove. As shown in FIG. 2, an air conditioner 30, a television 31, a light 32, a television 33, an air conditioner 34, a light 35, a gas stove 36, a light 37, a light 38, a television 39, a light 40 and an air conditioner 41 are setup in the physical space 20.

The control instruction sent by the user is used for controlling the target object. The user inputs the control instruction via a controller of the first control device 100, a controlling application corresponding to the first control device 100 installed in the user's smart phone, or other interfaces or medium and then sends the control instruction out.

After the user sends the control instruction through the above ways, implementations in the first control device 100 are as follows:

The first communication module 110 is configured to receive a control instruction, and the control instruction corresponds to a target object of at least one object. For example, the user could send a control instruction corresponding to the air conditioner 30 to the first communication module 110 via a smart phone.

The first processing module 120 is configured to determine whether the target object is within the control range. For example, the control range of the first control device 100 is limited the area of the living room A. In other words, the bedroom B, the kitchen C, the dining room D and the bedroom E are not within the control range of the first control device 100. The control range can be related to the maximum range that the first control module 130 is capable of controlling target object. For example, if the first control module 130 has the function of sending wireless signals, then the corresponding control range is related to a signal transmission power and a signal transmission structure of the first control module 130 or obstacles such as walls in the entity site.

The first control module 130 is configured to perform an operation task to the target object according to the control instruction when the target object is within the control range. A signal transmitting element such as an antennas or an infrared transmitter could be built in the first control module 130. For example, because the air conditioner 30 is setup in the living room A, which is within the control range of the first control device 100, the first control module 130 could directly perform an operation task to the air conditioner 30. For example, the first control module 130 sends a signal to turn on the air conditioner 30.

When the target object is not within the control range, the first communication module 110 forwards the control instruction to a counterpart control device. For example, when the user would like to control the television 39, the corresponding operation task can not be performed through the first control device 100. Thus, the operation task is forwarded to the second control device 200.

In one embodiment of the present disclosure, the first control device 100 is capable of determining whether each object is within their control range according to the location of each object. In other words, the relative information indicating whether the target object is within the control range has been recorded in the first control device 100. In another embodiment of the present disclosure, the first control device 100 could also directly attempt to implement the control instruction and observe if the target object can be controlled correspondingly. When the target object does not response, it means that the target object is not within the control range of the first control device 100.

Regarding the forwarding of the operation task, implementations in the second control device 200 are as follows:

The second communication module 210 is configured to receive the control instruction forwarded from the first control device 100. The control instruction corresponds to a target object of at least one object. For example, when the user would like to control the television 39, the corresponding control instruction will be forwarded from the first control device 100 to the second control device 200.

The second processing module 220 is configured to capture a target location of the target object. In the embodiment of the present disclosure, the second processing module 220 further calculates the target location of the target object according to a configuration figure, wherein the configuration figure can be a three dimensional figure of the physical space. However, in another embodiment of the present disclosure, the configuration figure also can be a two dimensional figure. The present disclosure is not limited to the embodiments above. The configuration figure can record location information of all objects.

The second driving module 240 is configured to drive second control device 200 for moving according to the target location. For example, when the second processing module 220 calculates that the television 39 is within the bedroom E according to the configuration figure, the second driving module 240 can drive the moving elements of the second control device 200 such as wheels so that the second control device 200 moves to the television 39 in the bedroom E.

The second control module 230 is configured to perform an operation task to the target object according to the control instruction after the second control device 200 moves according to the target location. A signal transmitting element such as an antennas or an infrared transmitter could be built in the second control module 230. After the second control device 200 moves to the target location, the target object is within the control range of the second control device 200. The second control module 230 can directly perform an operation task to the television 39. For example, the second control module 230 send a signal to turn on the television 39. As a result, through the task distribution between the first control device 100 and the second control device 200, the use is allowed to control the air conditioner 30, the television 31 and the light 32 in the living room A, the television 33, the air conditioner 34 and the light 35 in the bedroom B, the gas stove 36 and the light 37 in kitchen C, the light 38 in the dining room D, and the television 39, the light 40 and the air conditioner 41 in the bedroom E.

In the above embodiment, the target location is calculated through the second control device 200. However, in another embodiment of the present disclosure, the target location could be calculated through the first control device 100. For example, the first processing module 120 further calculates the target location of the target object according to the configuration figure, and sends the target location and the control instruction to the second control device 200. In other words, the configuration figure can be stored in either the first control device 100 or the second control device 200, or the configuration figure can be delivered between the first control device 100 and the second control device 200.

Moreover, because the second control device 200 is movable, the configuration figure could be created through the second control device 200. In the embodiment of the present disclosure, the second processing module 220 can further calculate a plurality of searching move path in the physical space and control the second driving module 240 for moving according to a recursive algorithm. Moreover, a plurality of images is captured through the second control module 230, and the second processing module 220 recognizes at least one object from the images. The configuration figure is created according to the location of each image. The recursive algorithm could be a depth first search (DFS), and could also be other algorithm. The present disclosure is not limited to the above embodiments. For example, the user presets that the configuration figure is created when no one is present in the physical space, so that the creation of the configuration figure will not be interrupted. The moving process of the second control device 200 is similar to the maze routing algorithm. Moreover, the configuration figure could be a three dimensional figure, so the three dimensional location information of the light on ceiling, the air conditioner on the wall or the television on the cabinet can be recorded in the configuration figure.

Since the aforementioned objects can be electric devices, in order to achieve integration of controlling and prevent the user from necessarily searching for a corresponding controller or control interface, the first control device 100 or the second control device 200 must store control signals corresponding to each electric device. In the embodiment of the present disclosure, the first communication module 110 could further connect to a cloud server for downloading an instruction set of each electric device. The first control module 130 performs operation task according to the instruction set corresponding to the control instruction. In another embodiment of the present disclosure, the second communication module 210 can further connects to a cloud server for downloading an instruction set of each electric device. The second control module 230 performs operation task according to the instruction set corresponding to the control instruction.

However, the aforementioned object can also be a non-electric device such as a gas stove 36. The operation task could be different from the controls of the aforementioned electric device. In the embodiment of the present disclosure, the operation task can be performed by capturing an image through the second control module 230. The second control module 230 can includes an image sensor such as a charge coupled device (CCD) or a complementary metal-oxide semiconductor (CMOS), etc. Then the second communication module 210 sends the captured image to the first control device 100. For example, when the user would like to confirm that if the gas stove 36 in the kitchen C has been turned off, a smart phone of the user is connected to the cloud server and the cloud server sends a corresponding control instruction to the second control device 200 via internet, or the cloud server sends the control instruction to the first control device 100 first, and then the first control device 100 forwards the control instruction to the second control device 200. The second control device 200 is able to calculate that the gas stove 36 is located in the kitchen C. Then the second control device 200 moves to the gas stove 36 and captures the image of the gas stove 36. Thereby, the user could observe the real-time image of the gas stove 36 via the user interface of the cloud server.

Moreover, other objects can be added into the physical space, so the relative control mechanism can be expanded correspondingly. In one embodiment of the present disclosure, when the first communication module 110 receives an object-added instruction, the first processing module 120 updates the configuration figure according to a new location of the object-added instruction. For example, the user can setup a location of the new object through accessing the aforementioned user interface. For example, the user could select a coordinate in a three dimensional configuration figure.

When a new object is added in the physical space, the update of the configuration figure can be performed automatically. In another of the present disclosure, when the second communication module 210 receives an object-added instruction, the second processing module 220 control the second driving module 240 for moving in the physical space according to the recursive algorithm to search for a new object so that the configuration figure can be updated. The recursive algorithm and the searching process in the embodiment are the same in the aforementioned embodiment, so not repeated here.

As described above, in one embodiment, the first control device determines whether the target object is within the control range. When it is determined that the target object is not within the control range, the control instruction is forwarded to the second control device so that the second control device is driven to move to the target location out of the control range of the first control device to perform a corresponding operation task. As a result, space limitations of controlling for the target object are overcome. In another embodiment, an instruction set corresponding to the control instruction of each object can be also downloaded in advanced from a cloud for integrating the control mechanism corresponding to a plurality of objects. Moreover, in another embodiment, based on the movable feature of the second control device, a recursive algorithm of the moving path could be performed to recognize each object one by one, and the configuration figure could be created automatically.

What is claimed is:

1. A control device, comprising:
    a communication module configured to receive a control instruction forwarded from a counterpart control device, wherein the control instruction corresponds to a target object of at least one object;
    a processing module coupled to the communication module and configured to capture a target location of the target object and further calculate the target location of the target object according to a configuration figure;
    a driving module coupled to the processing module and configured to drive the control device to move according to the target location; and
    a control module coupled to the processing module and configured to perform an operation task to the target object according to the control instruction after the control device moves according to the target location;
    wherein the configuration figure is a three dimensional figure corresponding to a physical space, the processing module further calculates a plurality of searching move path in the physical space according to a recursive algorithm and controls the driving module, wherein a plurality of images are captured by the control module, the processing module recognizes the at least one object from the plurality of images, and the configuration figure is created according to a location corresponding to each image.

2. The control device according to claim 1, wherein when the communication module receives an object-added instruction, the processing module controls the driving module for moving in the physical space according to the recursive algorithm to search for a new object for updating the configuration figure.

3. The control device according to claim 1, wherein the at least one object is an electric device, the communication module is further connected to a cloud server for downloading an instruction set of the electric device, and the control module performs the operation task according to the instruction set corresponding to the control instruction.

4. The control device according to claim 1, wherein the operation task comprises:
    capturing an image of the target object via the control module;
    wherein the communication module sends the captured image to the counterpart control device.

* * * * *